March 31, 1959  P. V. FEATHERSTON  2,879,765
THERAPEUTIC DEVICE
Filed June 25, 1957
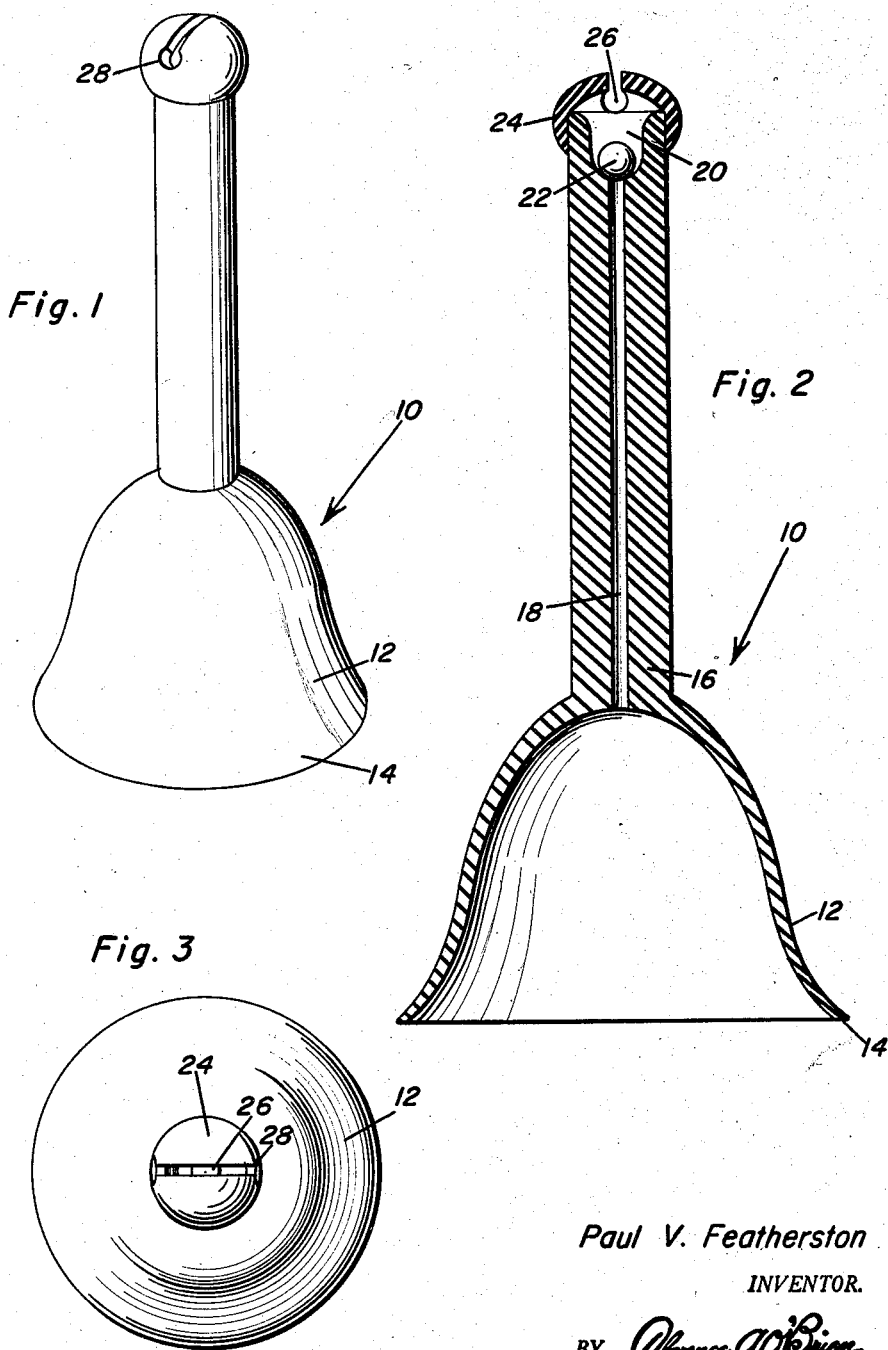
Paul V. Featherston
INVENTOR.

United States Patent Office 2,879,765
Patented Mar. 31, 1959

2,879,765

THERAPEUTIC DEVICE

Paul V. Featherston, Walla Walla, Wash.

Application June 25, 1957, Serial No. 667,935

1 Claim. (Cl. 128—67)

This invention relates to a therapeutic device and more particularly to an instrument adapted to be used by a physical therapist, physician, or by an individual in obtaining an optimum vacuum or suction on various parts of the body and particularly on the scalp for beneficial stimulation of the treated parts of the body.

The primary object of the present invention resides in the provision of a therapeutic device having novel means for creating a desired suction or vacuum therein and which is provided with a novel arrangement of a valve for maintaining the suction whereby effective treatment may be achieved by either a physician treating a patient or by an individual treating himself. It is the concept of this invention in particular to provide means whereby an individual can treat his scalp by obtaining a maximum of retraction of portions of the scalp to loosen the scalp and permit the reforming of impaired blood vessels, muscular tissues, hair follicles and the like whereby the health of the scalp is greatly aided.

One of the particular features of the invention lies in the use of a resilient cap frictionally detachably secured on the tube of the therapeutic device whereby various types of ball valves of different weights may be readily and easily substituted for each other and which resilient cap readily permits the passage of air through a slot therein which slot can be conceivably overlaid by the hand of the individual to further aid in maintaining the suction or vacuum.

Still further objects and features of this invention reside in the provision of a therapeutic device that is simple in construction, inexpensive to manufacture, and easy to use.

These, together with the various ancillary objects and features of the invention which will become apparent as the following description proceeds, are attained by this theraupeutic device, a preferred embodiment of which has been illustrated in the accompanying drawings, by way of example, only wherein:

Figure 1 is a perspective view of the invention;

Figure 2 is an enlarged vertical sectional view of the therapeutic device; and

Figure 3 is a top plan view of the device.

With continuing reference to the accompanying drawings wherein like reference numerals designate similar parts throughout the various views, reference numeral 10 generally designates the therapeutic device comprising the present invention. This therapeutic device includes a generally cup-shaped member 12 formed of rubber or other similar resilient material having an outwardly flared flexible peripheral lip as at 14. Integrally formed with the cup-shaped member 12 is a tube 16 having a central bore 18 extending therethrough. The bore 18 terminates in a recess 20 at the remote end of the tube 16. Disposed in the recess 20 is a ball valve member 22. This ball valve member may readily be a steel ball but may be made of rubber or plastic if such is desired. The ball valve member 22 is of a greater diameter than the diameter of the bore 18 yet of less dimension than the dimension of the recess 20 so as to be readily movable therein.

Retaining the ball against loss is a resilient cap 24 formed of rubber, plastic, or other suitable resilient material which is removably frictionally disposed on the end of the tube 16. The cap 24 is provided with a suitable slot 26 therethrough with the slot terminating in circular cut-outs as at 28.

The advantage of the circular cut-outs 28 is that they reduce the possibility of the further splitting of the resilient cap 24 and assure that the ball valve member 22 will not get in a position so as to be retained at the juncture of the cap and the tube where the cap is slotted.

It is noted that in use, the finger or other portion of the anatomy of the user may be positioned so as to overlie and close the slot 26 as desired.

In use, the cup 12 is pressed against the body of the patient at the selected portion, such as the scalp or the like with the lips of the cup spreading. When in this manner a vacuum is created, the ball valve 22 when seated will prevent the vacuum from being lost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A therapeutic device comprising a cup-shaped member of a resilient material having flared flexible lips and having an elongated tube integrally formed therewith oppositely disposed and remote from said lips, said tube having a bore therethrough communicating with the interior of said cup-shaped member, said tube having a recess in the end thereof remote from said cup-shaped member, and a ball valve member of greater diameter than the diameter of said bore and of smaller dimensions than the dimensions of said recess in said recess, a resilient cap frictionally fitted over said end of said tube, said cap having an air discharge slot therein of less width than the diameter of said ball valve member and having enlarged rounded ends to prevent said cap from splitting at the ends of the slot.

References Cited in the file of this patent

UNITED STATES PATENTS 1,201,767    Schimek _____ Oct. 17, 1916

FOREIGN PATENTS 484,028      Canada _____ June 17, 1952